Feb. 6, 1968 T. P. NEUBERGER 3,367,046
VISUAL SIMULATOR
Filed Dec. 22, 1965 2 Sheets-Sheet 1
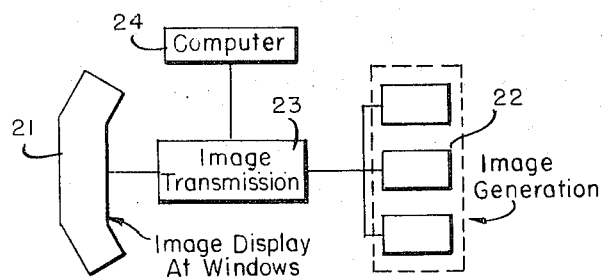
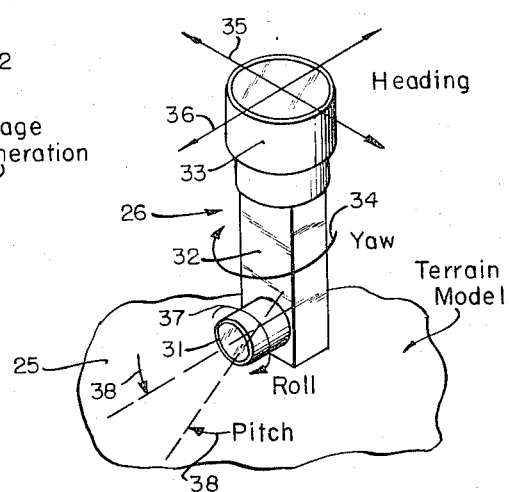
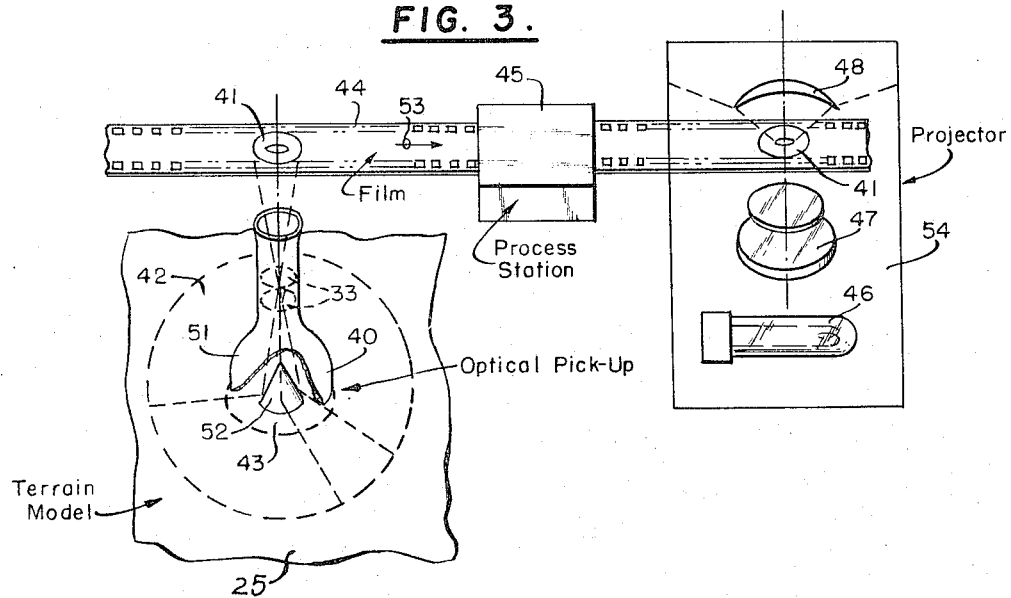
INVENTOR
Thomas P. Neuberger
BY William Grobman
ATTORNEY INVENTOR
Thomas P. Neuberger United States Patent Office
3,367,046
Patented Feb. 6, 1968

3,367,046
VISUAL SIMULATOR
Thomas P. Neuberger, Baltimore, Md., assignor to General Precision, Inc., Binghamton, N.Y., a corporation of Delaware
Filed Dec. 22, 1965, Ser. No. 515,582
8 Claims. (Cl. 35—12)

ABSTRACT OF THE DISCLOSURE

In training devices used to simulate the operation of vehicles, visual effects are often important. This disclosure describes a system for projecting onto a screen placed before a pilot trainee in an aircraft simulator a realistic view of terrain over which his simulated flight takes place. The image comprises a photograph of a three-dimensional model taken immediately ahead of the simulated aircraft, processed and projected onto the screen. A computer receives signals representative of the changes in the condition of the controls as the trainee flies the mission, and performs the necessary computations to develop signals which determine the direction and extent of film and camera displacement to compensate for the changed viewpoint of the trainee.

This invention relates to a visual simulator and more particularly to a device for producing changeable visual simulations.

Visual simulation is not new. In the past, several types of visual simulators have been developed and used for training aircraft pilots, automobile drivers, radar operators and the like. In each case, there has been the problem of creating realistic images with inexpensive equipment which will cause the images to change plausibly in response to actions of the student as well as in response to actions of the instructor. One of the earliest devices used was a moving picture projection of a roadway which wound through hills, past schools, and the like, and incorporated a model of an automobile steering wheel. As the filmed conditions changed, the operator, who was at the wheel, responded to cause the projected image to move so as to keep the imaginary automobile he was driving from going off the road. This type of simulation was fine for the situation, but in modern training systems, greater reality is desired.

In modern aircraft, and in modern space travel, fast reaction time of the pilots is necessary for survival. This fast reaction time must be achieved during the training period. Training is more cheaply accomplished with desirable results in a stationary trainer model which simulates the craft than in the craft itself. In a stationary trainer, the instructor, for example, can interrupt a particular operation and go over it again with comments to the student; and this, at a time when it is most effective to drive the point home. In addition, in the case of an aircraft, there is no delay time while the student takes off and again while the ship is being landed. The student enters the cockpit of his simulated craft, and the training begins. In addition, there is the obvious additional safety of using a stationary trainer rather than an aircraft which may expose the pilot-trainee and the entire crew, as well as innocent persons in the vicinity, to the possible danger of a mistake in judgment and subsequent crashing of the craft.

However, to properly train a pilot, for example (and pilots and aircraft are used in this discussion merely as suitable examples of the principles being discussed) to acquire the fast reactions which are necessary in times of danger to protect himself and his ship, reality in the simulation is necessary. There are several types of image protection equipment which are used for visual simulation. The projection of transparent images formed on film such as photographic film creates realistic images. This type of system can be adapted to operate in many different kinds of environment and produces believable images. However, it is difficult to program film image projection to create the impression of constant change with respect to variations in the conditions of the simulated mission. Television transmission, on the other hand, is easily modified to simulate changed conditions, but the lines in the television raster and the distortions at the edges of the cathode ray tubes detract from the plausibility of the images. So far, no attempt to marry the two systems to produce a readily modified image which is easily believed has been successful.

It is an object of this invention to provide a new and improved system for creating plausible creation of images which can be modified with changing conditions.

It is another object of this invention to provide a new and improved visual system.

It is a further object of this invention to provide a new and improved visual system which creates an image having high resolution and plausibility.

It is still another object of this invention to provide a new and improved visual system in which a photographic image is projected in front of the student to create a believable image.

It is still a further object of this invention to provide a new and improved visual system in which a fast film process is utilized to produce a photographic image which is then immediately projected to show changing conditions as they are at the time.

Other objects and advantages of this invention will become more apparent as the following description proceeds, which description should be considered together with the accompanying drawings in which:

FIG. 1 is a block diagram of a generalized visual simulation system;

FIG. 2 is a pictorial view of an optical pick-up in regular use;

FIG. 3 is a schematic showing of the over-all system of this invention;

Figure 4:
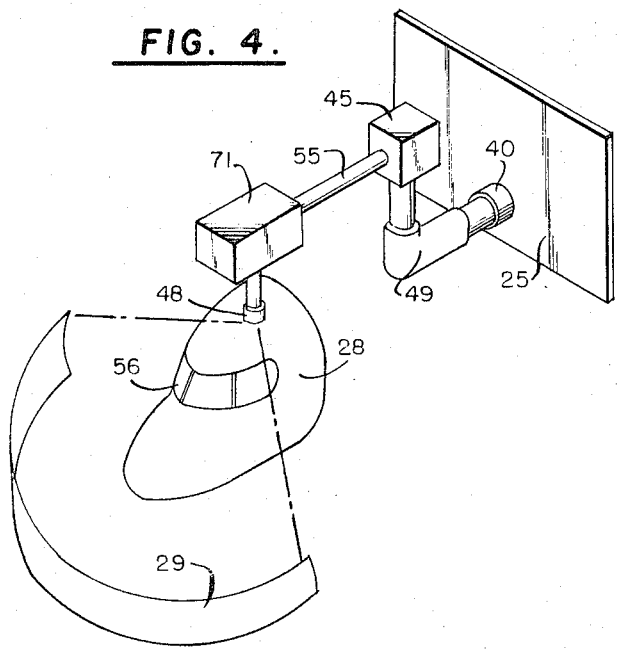
FIG. 4 is a pictorial representation of the system of FIG. 3.

Referring now to the drawings in detail, and more particularly to FIG. 1, the reference character 21 designates a screen which is in front of a trainee and upon which the intended image is projected. The image is generated in the image generation equipment 22 and transmitted to the screen 21 by means of the image transmission equipment 23. A computer 24 which is controlled by both the instructor and the actions of the student, modifies the operation of the image transmission equipment 23 to effect the final image which appears on the screen 21. The system shown in FIG. 1 is a generalized system which includes the equipment normally found in a visual simulator which is used to train individuals in the operation of machines and vehicles.

The image generated in the generator 22 may be by any standard means. For good resolution and accuracy of color, the projection of an image formed on photographic film is suitable. For ease of manipulation by the computer 24, television generation and projection is preferred. The image, no matter how generated, is transmitted to the screen 21 where it is viewed. In a television type of system, the transmission equipment 23 would be the transmission wires, cathode ray tube and circuits, and optical projection equipment. In a straight optical system, the transmission equipment 23 would includes the lenses and mirrors necessary to project the desired image onto the screen 21. In either case, the computer 24 is programed to modify the image on the screen 21 as the student reacts to the image and performs his function, right or wrong, and to the actions of the instructor as he modifies the problem presented to the student. In a television system, the electrical information which forms the television image may be transmitted through the computer 24 and modified by appropriate potentials from the trainee's equipment and the trainer's equipment. In a straight optical system where the image is generated by a film projector and is transmitted optically to the screen 21, control and modification by the computer 24 is more difficult. Lens systems can be constructed to change their light transmission characteristics in response to electrical signals; mirrors can be constructed to tilt and otherwise move; the film can be changed. But, in each case, the film must be prepared in advance for use at a later time. And in this type of operation, it is difficult, if not impossible, at the time the film is prepared, to anticipate all of the possible changes which might be evoked by the trainee and in what order the changes will occur. For these reasons, television systems have been most popular. But one of the primary objects of a visual simulation system is plausibility in the image produced. The raster lines and the distortion about the edges of the cathode ray tubes used in the television system tend to defeat the reality which is to be evoked by the image.

One of the devices used to help create the plausibility desired in visual simulation is illustrated in FIG. 2. Particularly when television systems for simulation are used, the image being presented to the trainee on the screen 21 is often generated by picking up an image from a small scale, three-dimensional model. Thus, let it be assumed for this discussion that the image appearing on the screen 21 is that of an airport which the student is to be approaching and of the surrounding countryside. A model 25 of this terrain is prepared and is viewed by a television camera. The camera must be adapted to produce the motions or movements of the view which the trainee would see if he were actually looking out the windshield of his aircraft. Thus, as shown in FIG. 2, an optical pick-up 26 may comprise a lens 31 which is mounted on a light-tight tube 32 to be projected into an image orthicon 33, or the like. The model is schematically shown at 25 being viewed by the lens 31 which has a relatively narrow field of view. The entire device is mounted to move so that the final image has imparted to it the movements which are typical of an aircraft in flight. The arrows 35 and 36 designate the movement of the unit over the terrain in the X and Y directions as the flight progresses. The arrow 34 designates the yaw, which is sideways motion, as the ship moves. Roll is shown by the arrow 37, and pitch is shown by the arrows 38. The entire pick-up 26 views the model 25 on what is essentially a horizontal plane, looking down on the model from above. This is very similar to the manner in which a pilot in an aircraft views the terrain over which he is flying. Because of the general field of view of an optical pick-up 26 of the type shown in FIG. 2, it must be mounted to move as shown, and the image which it receives as it moves through any of the directions shown must be able to instantaneously change to demonstrate the results of that movement. The computer 24 receives signals representative of an action from the trainee, and it, in turn, transmits to the apparatus supporting the pick-up 26 signals which direct the proper movement of the pick-up. This type of pick-up is useful in simulation systems which produce instant images, such as television systems. It is not particularly good in systems which use previously prepared films. The image on the film is fixed, and the movement of the lens system is not going to change it very much.

FIG. 3 illustrates a system which utilizes images recorded on a photographic film but which has the ability to respond to changing conditions introduced by both the trainee and the trainer with a very short time lag. The model 25 of the airport and the surrounding countryside is being viewed by an optical pickup 40. The optical pick-up comprises a housing 51 which contains a cone-shaped prism 52 and a lens system 33. The image of the area within the dashed lines 42 is viewed by the pick-up 40 and is projected by the lens 33 onto a moving photographic film 44 to expose an annular image 41 on the film. The film 44 moves in the direction of the arrow 53 from the optical pick-up 40 to a process station 45. When the processed film 44 emerges from the station 45, it passes to a projector 54 which comprises a projection lens 46 which generates light and heat. The heat is absorbed and the light is concentrated by a combination condensing lens and heat cell 47, through the image 41 on the film 44 and through a projection lens 48 onto a screen (not shown).

The optical pick-up 40 has its lower portion transparent to light and its bottom opaque. Light reflecting from the model 25 passes through the transparent portion of the housing 51 and impinges upon the cone-shaped prism 52. The prism reflects the light from the model 25 through the lens system 33 onto the film 44. Because of its construction, the optical pick-up 40 "sees" an annular shaped area 42 of the model 25 in a circle 360° in extent but does not see that portion of the model 25, shown in dashed lines 43, which is immediately below the pick-up 40. This provides an annular image which would cover that area seen by a pilot or a trainee in a plane which is free to rotate. The film 44 is exposed by this image 41 which is projected upon it, and the latent image 41 is developed and fixed in the process station 45. The film 44 must be a fast processed film which may be similar to that being marketed by the Polaroid Corporation at present. The film should be completely processed during an interval in the order of three seconds and may, if necessary, move into the projector 54 while still wet. Equipment similar to this is shown in greater detail in such patents as 2,688,278 to Tuttle and 2,856,829 to Orlando. The optical pick-up 40 views a complete circle, but only a portion of this image may be used at any instant. The lens system 48 should preferably project an image which covers a span of 180° so that a trainee is virtually surrounded by the image of the surrounding countryside. Since the process time of the film 44 is so short, the optical pick-up 40 may be mounted for movement in two directions over the model 25 so that it can continually pickup a different portion of the model 25 as the training mission proceeds, and the results will be a continuously responsive visual simulation. The movement of the optical pickup 40 should be coordinated with the simulated movement of the aircraft and, as the trainee acts to change the direction of flight, the direction of movement of the optical pick-up should also change.

This might be better understood from FIG. 4 which shows the model 25 vertically disposed and exposed to the optical pick-up 40 which is mounted on an image transmission tube 49 which transmits the image of the model 25 as seen by the optical pick-up 40 onto a film in the process station 45. The process station 45 as shown in FIG. 4 also includes the projection lamp 46 and the condensing and heat absorption cell 47, to transmit the image which is developed on the film 44 through a second optical transmission tube 55, through a device 71 for adding the image of a horizon, and to the projection lens system 48 which projects the image upon the semi-circular screen 29. A trainee sitting in a cockpit 28 looks through the windshield 56 to see the image projected onto the screen 29.

Although not shown in FIG. 4, the entire unit which comprises the optical pick-up 40, the transmission tube 49, the process station 45, transmission tube 55, horizon generator 71, and projection lens system 48 is mounted for movement vertically and horizontally so that the optical pick-up 40 may move the model 25 in a direction which simulates the line of flight of the aircraft cockpit 28. This entire assembly could be mounted upon a vertical rack and driven by the movement of the pinion with the rack mounted for movement upon rails, for example, with separate motors driving the pinion and the movement over the rails, various combinations of X and Z movement can be obtained to develop a final resultant which is the line of flight. The support structure is well known and has been omitted from this figure to avoid unnecessary clutter. As the optical pick-up 40 moves with respect to the model 25 the film contained within the process station 45 is continually exposed and processed, and the newly developed images are projected through the tube 55 to the horizon generator 71. It is necessary to add to the image picked up by the optical pick-up 40 an artificial horizon together with an image of the sky, including clouds, the sun, etc., since this type of image cannot be obtained from the model 25. This is a fairly simple type of image generation. An image from the optical pick-up 40 and that of the horizon may be readily combined in a common optical element to be transmitted by lens system 48 onto the screen 29.

As mentioned above, the optical pick-up 40 is mounted for movement across the model 25 at a speed and in a direction which approximates the speed and direction of an aircraft 28 across actual terrain. There is, however, one difficulty in the operation of the system of this invention. Although the optical pickup 40 does move across the model 25 in a manner which closely simulates to the trainee the movement of his aircraft across the countryside, when the trainee acts to change the direction of the aircraft, the direction of movement of the optical pick-up 40 also changes. However, there is an interval between the time the pick-up picks up the image and the time when that image is projected before the trainee. This means that the pick-up 40 is always ahead of the aircraft itself. Thus, when the trainee acts to change the direction of his ship, he is at a point where the optical pick-up has already been and gone. The equipment must be constructed to compensate for this difference in time.

Figure 5:
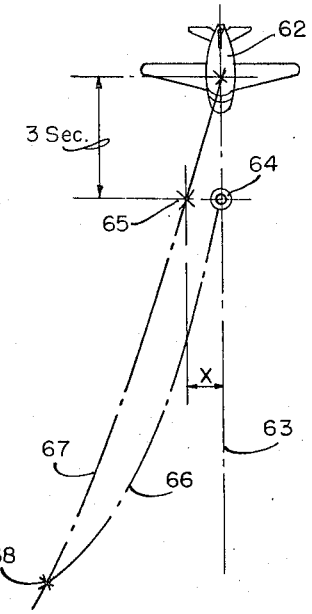
FIG. 5 is a schematic showing of the manner in which the optical pick-up moves to compensate for changes in the path of the simulated aircraft.

FIG. 5 illustrates the situation mentioned above where a simulated aircraft 62 is shown proceeding along a simulated line of flight 63. According to the system of this invention as described above, the optical pick-up at this time is at the point designated 64. Assume for this discussion that at the time and with the relation of the points shown in FIG. 5, the trainee swerves his aircraft 62 so that it now proceeds along a second line of flight 67 which can be considered the new line of flight. This action is transmitted through suitable equipment to a computer 24 which supplies the signals to cause the optical pick-up, shown here at 64, also to swerve and follow a path designated 66. Eventually, path 67 and the path 66 of the optical pick-up 64 will meet at point 68. Thereafter, the problem will proceed normally. However, to compensate for the intervening situation represented by the different flight paths 66 and 67, provision must be made to display before the trainee the terrain he would be seeing along flight path 67 and not the terrain which would be picked up by the optical pick-up along a path 66 different therefrom. This may be done by means of a computer program which generates the stimulus for, in effect, sliding or shifting the film 44 so that the pilot sees what appears to be the situation with the optical pick-up at point 65 instead of a point 64. Consider the annular area 42 in FIG. 3 as it is viewed by the optical pick-up 40. The central portion of the annulus 42 is the blind spot which represents the portion immediately beneath the trainee. If the film 44 or that portion of the film 44 which is being projected is moved with relation to the projection equipment so that the image is, in effect, displaced slightly to one side, what is then being projected is the terrain which lays slightly to the side of position 64 and not that which is directly in front of position 64. Thus, as the trainee turns his aircraft 62, the image which is projected on the screen 29 before him moves with the apparent turning of the aircraft and presents to him an image of the terrain off to the side. This shift or displacement of the film with respect to a true position continues until the computer has determined that the actual flight path 67 of the ship 62 and the flight path 66 of the optical pick-up meet at the point 68. In actuality, the shifting of the film with respect to the central point or true position does generate a slight bit of distortion in the "point of view" of the trainee, but this distortion is very small and can be readily tolerated in this system.

Figure 6:
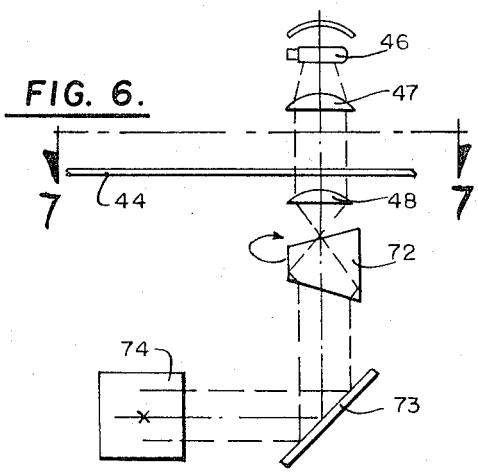
FIGS. 6 and 7 are schematic showings of one system for displacing the final image in the system of this invention.
Figure 7:
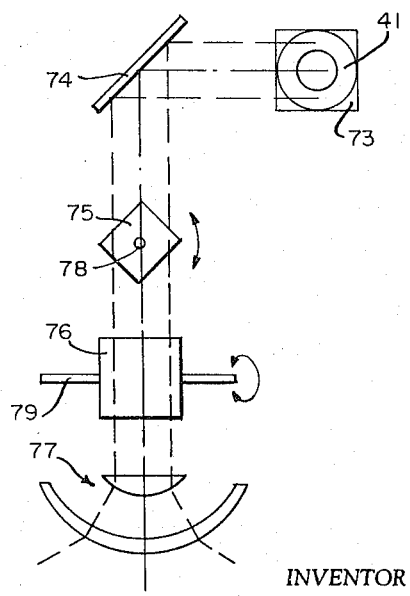

FIGS. 6 and 7 schematically illustrate one possible system for optically changing the portion of the image 41 which is being projected onto the screen 29. The film 44 is shown with light from a lamp 47, condensed by a lens 47, passing through it. The image which has been formed on the film 44 is then transmitted by the light passing through it through the relay lens 48 and a dove prism 72 which is mounted to be rotated on its optical axis. The image passing through the dove prism 72 then is reflected by a mirror 73, which is mounted at 45° to the optical axis, onto a second mirror 74, which is also mounted at an angle of 45° to reflect the image outward from the plane of the drawing. In FIG. 7, the system shown in FIG. 6 is shown looking in the direction of the arrows VII—VII. In this figure, the image 41 on the film 44 is shown superimposed on the mirror 73. This image is then reflected to the left onto mirror 74 which, in turn, reflects the image downward through the double prism 75 which is mounted to rotate on an axis 78 through its center perpendicular to the plane of the paper. The image passing through the double prism 75 also passes through a second double prism 76 which is mounted to rotate on an axis 79. The image passing through the double prism 76 is projected by wide angle projection lens 77 onto the viewing screen, not shown in these figures.

The optical system shown in FIGS. 6 and 7 is designed to move the image in the manner required to provide a plausible simulation of the movement of an aircraft in flight. When the simulator of this invention is used in other forms of equipment, the means for moving the image must be designed to meet the requirements of that system. The dove prism, when it is stationary, ordinarily rotates the image passing through it by an angle of 180°. In the system of this invention, the dove prism 72 is mounted to rotate on an axis which is concentric with its optical axis. As the prism 72 is rotated, the image which falls upon the mirror 73 is also rotated. The mirror 73 may be mounted for movement which is coordinated with the rotation of the prism to maintain the image path the same length regardless of the rotational position of the prism 72. The same is true of the mirror 74 which may move with the mirror 73 for the same purpose. The image is reflected out of the plane of the paper by the mirror 74. To show this action, FIG. 7 illustrates the image 41 on the film 44 superimposed on the mirror 73 (the lens 48 and the prism 72 have been omitted from this view to avoid cluttering the drawing unnecessarily) and the image is reflected from the mirror 73 onto the mirror 74. The image reflected from the mirror 74 is passed through a double prism 75 and a double prism 76 in sequence, the two prisms 75 and 76 being mounted to rotate on axes which are at right angles to each other. With the prisms 75 and 76 positioned as shown, with the corner at the top, the image passes through without being unduly affected thereby. However, as the prisms are rotated, the image is moved in the direction of rotation. Consider, for example, the prism 75 being rotated clockwise through a small angle. As the prism 75 moves clockwise, the angle at which the light from the mirror 74 strikes the prism changes, and the internal refraction changes. The changes are such that the image rotates with the axis prism. The same operation is true of the prism 76 except that the axis of rotation is at right angles to that of the prism 75. The image is finally projected through the wide angle lens 77 onto the screen where it is viewed by the observer.

The rotation of the dove prism 72 is under the control of the control or computer such as that shown in FIG. 1 at 24. Using the illustration of the system of FIG. 5 as an example, the prism 72 is rotated when the pilot-trainee acts to turn his aircraft. As the aircraft 62 turns, the prism 72 is rotated. This causes the portion of the image 41 on the film 44 which is projected onto the screen 29 to change. Consider, for example, the annulus 41 which is the developed image on the film 44. Only a portion of the annulus (probably not more than 180°) is projected onto the screen 29 at any time. If the portion of the annulus designated, say 0°–180°, is projected onto the screen 29, and then the student acts to cause his aircraft 62 to turn, the portion of the annulus which is then projected may change to, say 20°–200°. His view of the model 25 is changed. This rotation is accomplished by the prism 72. In addition, as the aircraft 62 flies, it is subject to the changes in attitude known as pitch and roll. The rotation of the double prism 76 moves the image vertically to simulate pitch; the rotation of the prism 75 moves the image to simulate roll. Yaw is simulated by the rotation of the prism 72. Thus, the system shown in FIGS. 6 and 7 optically changes the image projected onto the screen 29 to be viewed by the observer to accomplish the simulation required.

The system described above in this specification comprises a new and improved visual simulator which utilizes rapidly processed photographic film to generate optical images which can be changed sufficiently rapidly to simulate changed conditions in the problem being run. The system contemplates the use of a computer to control the projection of the image from the processed film and the movement of the optical pick-up in accordance with instructions inserted by the trainer and the reactions thereto of the trainee. It is realized that the above specification may indicate to others in the art additional ways in which the principles of this invention may be utilized, and it is, therefore, intended that this invention be limited only by the scope of the following claims:

What is claimed is:

1. A system comprising a simulated vehicle trainer and apparatus for providing a trainee with an image of an environment through which his simulated vehicle appears to be moving, said image being modified by time and by changes in the simulated direction and speed of the vehicle to provide a realistic appearance of movement by a changing panorama, said vehicle including a vehicle operator station having vehicle controls and instruments, said apparatus comprising an optical pick-up for viewing a model of the environment in question and creating an image thereof in an image plane, means supporting said optical pick-up for free movement across said model in response to instructions, a photosensitive film in said image plane arranged to be exposed by the image projected by said pick-up, a film processing station containing means for developing the latent image exposed on said film, means for moving said film from said image plane to said processing station, a projection station for projecting an image developed on said film to a location for viewing by an observer, means for moving said film from said processing station to said projection station, means responsive to the operation of said vehicle controls for generating instructions for appropriately controlling the movement of said pick-up across said model, said instruction generating means including means for computing new paths of movement for said optical pick-up in response to changes in the simulated direction of movement of said vehicle to provide a rapid convergence of the paths of travel of said vehicle and said pick-up, and means for optically modifying the projection of an image from said film in response to changes in the simulated direction of movement of said vehicle to provide changes in the direction of view and in the points of view between the time the simulated vehicle changed direction and the time the paths of travel converge.

2. The system defined in claim 1 wherein the elapsed time from the exposure of the film to the projection of the image developed thereon is in the order of three seconds or less.

3. The system defined in claim 1 wherein the field of view of said optical pick-up comprises an included angle of greater than 180°.

4. The system defined in claim 3 further including a projection screen located so as to be viewed by the trainee in his normal operations, said projection station being situated to project the image developed on said film onto said screen.

5. The system defined in claim 1 wherein said means for modifying the image being projected by said projection station compensates for the process time of said film, said modifying means including control equipment responsive to the immediate actions of said trainee, said control means interpreting the actions of said trainee to divide its response into pick-up outputs and projection outputs, means responsive to pick-up outputs to modify the position of said pick-up, and means responsive to projection outputs to change the aspect of the image being projected from one portion of said film image to another.

6. The system defined in claim 5 wherein said means for modifying the portion of the image being projected at any time comprises an optical projection system which includes a projection light source for projecting light through said film image, a projection lens system having an optical axis, a reflector mounted to reflect the image passing through said projection lens at an angle to said optical axis, and means for moving individually and in concert said projection lens and said reflector in response to the projection output from said control means to move the image being viewed by said trainee to create the impression in the observer that the trainee is being moved in response to his own actions.

7. In a simulated vehicle training system which includes a simulated vehicle having vehicle controls and a trainee station for containing a vehicle trainee who manipulates the vehicle controls to produce simulated vehicle response, said system including apparatus for producing a visual image of the simulated environment through which the simulated vehicle and trainee apparently move during a training mission, said image automatically changing with simulated movement of said vehicle and with changes in simulated vehicle direction and speed, said apparatus comprising a model of the environment through which the vehicle is to move, an optical system mounted for movement past said model to scan said model, and arranged to focus an image of a portion of said model at any time onto an image plane, a photosensitive film in said image plane, a projection screen placed in the view of a trainee in said vehicle, a photosensitive film processing station, a film projection station which includes means for projecting images formed on film onto said screen, means for moving said film from said image plane to said processing station wherein the latent image focussed onto said film by said optical system and then to said projection station from which the image formed on the film is projected onto the screen, and means for causing said apparatus to change the view which the trainee is presented on the screen to correspond with the simulated movements of said vehicle, said means for causing said view to change comprising first means for driving said optical system past said model and second means for changing the portion of the film image being projected, said first and second means being responsive to the manipulations of said vehicle controls by the trainee, and control means for deriving from changes in the simulated direction of movement of said vehicle and from the amount of lead of the optical system ahead of said vehicle occasioned by the time required to process the film signals for controlling said first means to bring into coincidence the paths of travel of said optical system and said vehicle as soon as possible.

8. The system defined in claim 7 wherein said optical system includes means for projecting an image covering an area greater than 180° onto said film, and wherein said projection means includes first optical elements arranged to be rotated to modify the apparent direction of view of the image being projected and second optical elements arranged to be rotated to modify the apparent viewpoint of the image being projected, said first and second optical elements being rotated in response to manipulations of said vehicle controls.

References Cited

UNITED STATES PATENTS

| | | | |
|---|---|---|---|
| 2,688,278 | 9/1954 | Tuttle | 95—14 |
| 2,727,446 | 12/1955 | Tuttle | 95—14 |
| 2,856,829 | 10/1958 | Orlando | 95—14 |
| 2,959,779 | 11/1960 | Miller et al. | 343—6 |
| 2,966,096 | 12/1960 | D'incerti et al. | 88—16.8 |
| 3,052,753 | 9/1962 | Schwarz et al. | 178—6 |

FOREIGN PATENTS 1,290,820  3/1962  France.

JEROME SCHNALL, *Primary Examiner.*

EUGENE R. CAPOZIO, *Examiner.*

R. W. WEIG, *Assistant Examiner.*